United States Patent [19]
Leicht

[11] Patent Number: 5,860,759
[45] Date of Patent: Jan. 19, 1999

[54] CONNECTOR FOR FRAME MEMBERS

[76] Inventor: Frank Leicht, 4517 W. Grove, Skokie, Ill. 60076

[21] Appl. No.: 694,417

[22] Filed: Aug. 12, 1996

[51] Int. Cl.[6] ...................................................... B25G 3/00
[52] U.S. Cl. .......................... 403/334; 403/340; 403/331; 403/363; 403/409.1; 108/192; 5/9.1
[58] Field of Search ..................................... 403/334, 211, 403/340, 363, 374, 409.1, 331, 353; 108/192, 193, 153; 5/9.1, 282.1

[56] References Cited

U.S. PATENT DOCUMENTS

| | | | |
|---|---|---|---|
| 1,537,459 | 5/1925 | Campbell | 108/153 X |
| 1,571,601 | 2/1926 | Richards | 108/153 |
| 2,256,996 | 9/1941 | Bales | 108/153 |
| 3,366,357 | 1/1968 | Rudow et al. | 403/331 X |
| 4,019,298 | 4/1977 | Johnson, IV | 403/331 X |
| 4,135,837 | 1/1979 | Suttles | 403/353 X |
| 4,389,133 | 6/1983 | Oberst | 403/331 X |
| 4,436,342 | 3/1984 | Nilson et al. | 402/409.1 X |
| 4,684,285 | 8/1987 | Cable | 403/331 |
| 4,867,598 | 9/1989 | Winter, IV | 403/381 |
| 5,244,300 | 9/1993 | Perreira et al. | 403/409.1 X |
| 5,522,101 | 6/1996 | Yeh | 5/9.1 |
| 5,524,394 | 6/1996 | Szabo, Sr. et al. | 403/331 X |

Primary Examiner—Daniel P. Stodola
Assistant Examiner—Bruce A. Lev
Attorney, Agent, or Firm—Paul H. Gallagher

[57] ABSTRACT

A pair of steel counterpart pieces, of steel, each being integral, and including a backing element, a side blade element, and a hook element. The side elements are on opposite side edges respectively of the backing elements. The pieces are mounted on frame members to be connected that have flat surfaces that interengage. Upon camming action between the pieces of the connector the frame members are brought toward each other with their flat surfaces interengaging.

8 Claims, 2 Drawing Sheets

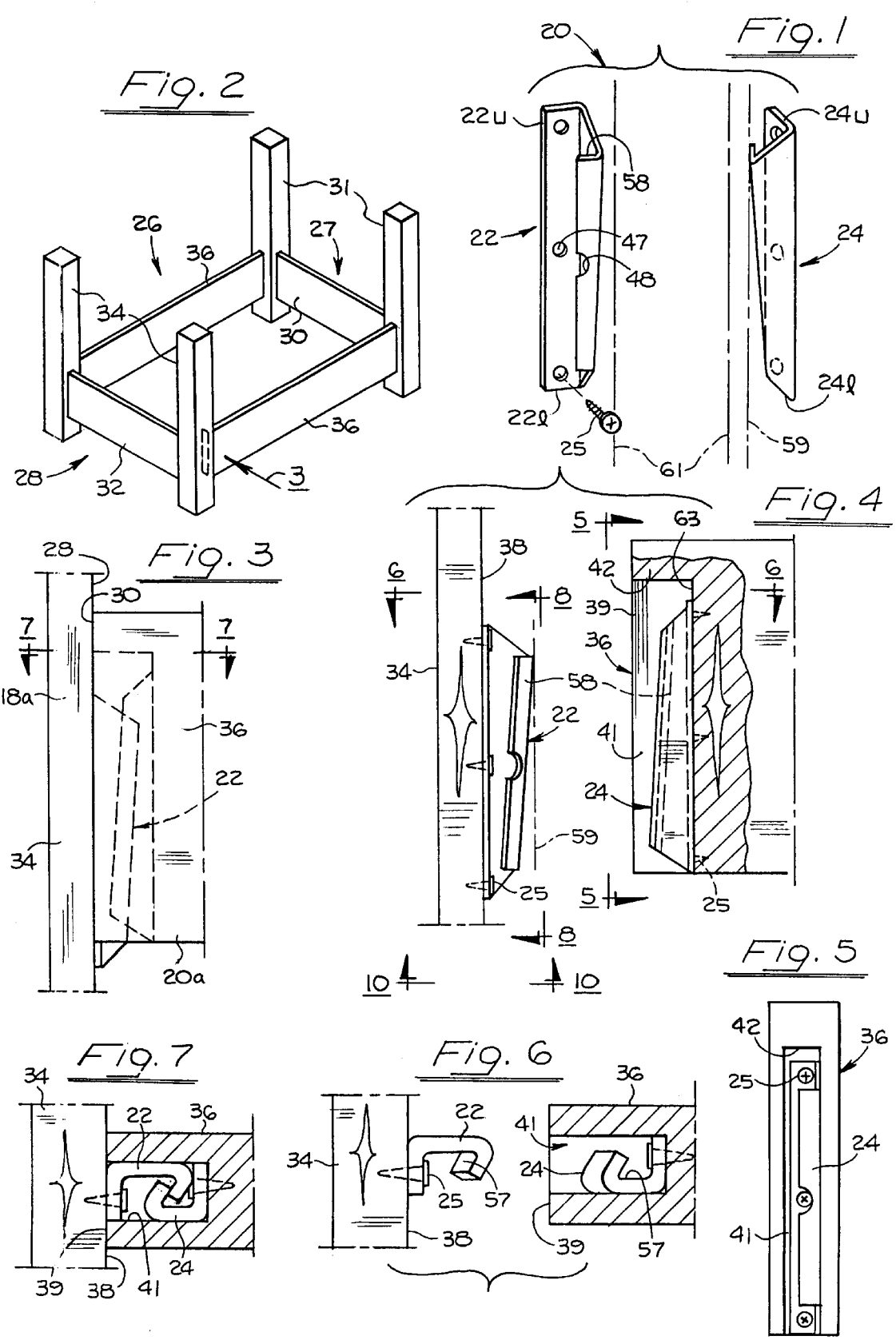

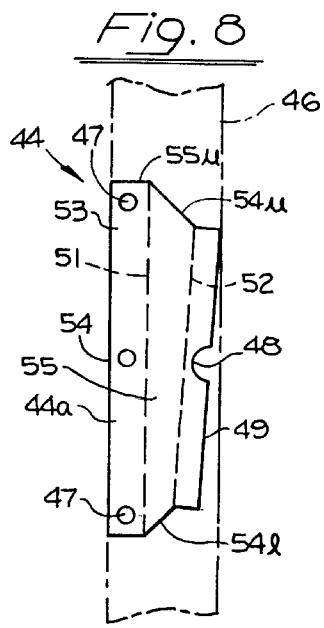
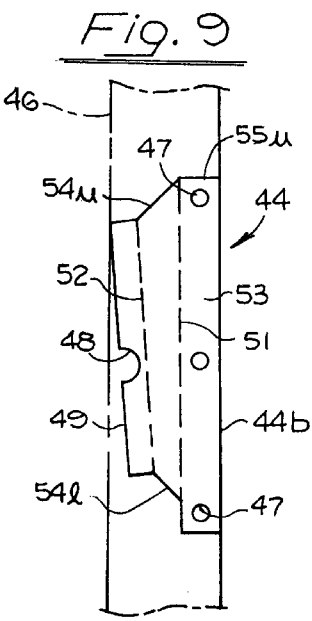
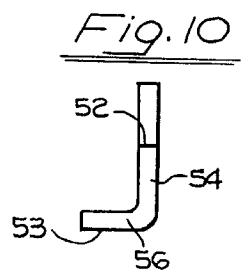
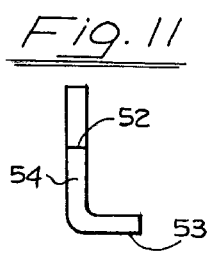
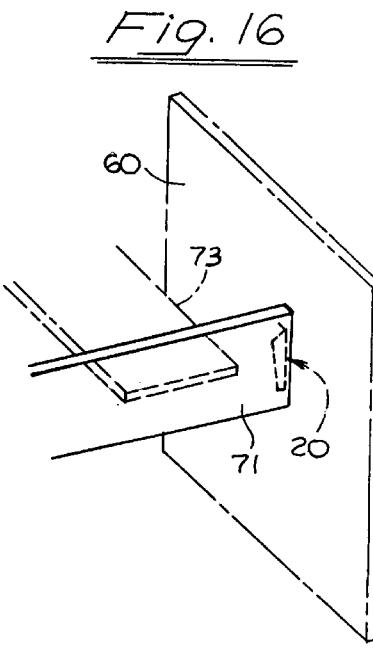
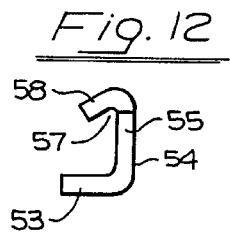
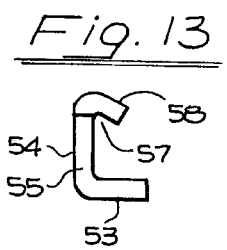
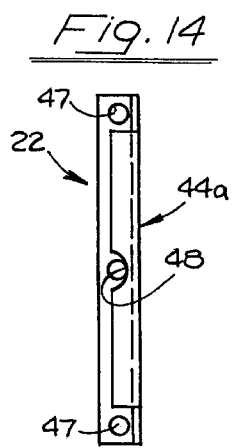
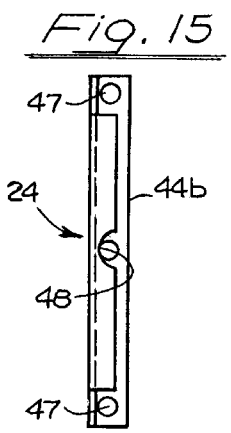

CONNECTOR FOR FRAME MEMBERS

SUMMARY OF THE INVENTION

The invention resides in the field of connectors for detachably interconnecting frame members, such as wooden frame members.

The connector is adaptable for use in various installations, a particularly common one being bed frame members, but it is also useful in other situations, such as mounting brackets on the wall, connecting bookcase pieces, in frames for displaying goods.

A principal object is to provide a connector of the foregoing character that is very simple in construction, and thereby inexpensive to manufacture, and it is extremely simple in its use in connecting steps. It includes interacting pieces that are made from a continuous strip of steel, and shaped and finalized by simple stamping and forming steps.

Another object is to provide a connector that is particularly adaptable to quick-detachable connecting the frame members.

Another object is to provide such a connector in the use of which, when the frame members are interconnected, they are interfitted against each other, i.e. the frame members have surfaces that interengage, and their interengagement provides a limit position for connecting them together.

An additional object is to provide such a connector that, when it is mounted on the frame members, it is nearly entirely hidden, and can be so entirely hidden.

BRIEF DESCRIPTIONS OF THE INDIVIDUAL FIGURES OF THE DRAWINGS

FIG. 1 is perspective view of the connector with the parts separated.

FIG. 2 is a perspective view of a bed frame, in which the connector of the invention is utilized.

FIG. 3 is a face view of a fragment of the frame, taken as indicated by the arrow 3 in FIG. 2, indicating the position of the connector means in the frame.

FIG. 4 is a large scale view oriented in the direction of FIG. 3, of the two frame members in separated position, one of the members being shown partially in section.

FIG. 5 is an end view taken at line 5—5 of FIG. 4.

FIG. 6 is a view taken at line 6—6 of FIG. 4.

FIG. 7 is a view oriented according to FIG. 6 but with the parts connected.

FIG. 8 is a face view of a stamping which after forming constitutes one piece of the connector.

FIG. 9 is a face view of the same stamping of FIG. 8, but showing the opposite side and which after forming, constitutes the other piece of the connector.

FIG. 10 is an end view oriented according to the lower end of FIG. 8, but after a first forming step of the piece.

FIG. 11 is an end view oriented according to the lower end of FIG. 9, but after a first forming step of the piece.

FIG. 12 is a view of the piece of FIG. 10 but after a second, and final forming step.

FIG. 13 is a view of the piece of FIG. 11 but after a second, and final forming step.

FIG. 14 is a top view of the piece of FIG. 12.

FIG. 15 is a top view of the piece of FIG. 13.

FIG. 16 is a perspective fragmentary view of the connector used in a shelf mounting.

DETAILED DESCRIPTION OF THE DRAWINGS

The connector of the invention, identified at 20 is shown in its entirety in FIG. 1. The connector includes two pieces, a bracket 22 and a hanger 24. These two pieces constitute the entire connector except for screws for mounting the pieces, such a screw being shown at 25.

The connector of the invention finds particular use in bed frames, but it is not limited thereto and may be utilized in other devices, such as shelf mountings, etc. The connector generally may be utilized for connecting frame members, which are most often of wood, but which may be of other materials, being adapted to quick connection and disconnection.

FIG. 2 shows a bed frame 26 which includes a headboard sub-frame 27 and a footboard sub-frame 28. The sub-frame 27 includes a headboard 30 and posts 31, while the sub-frame 28 includes a footboard 32 and posts 34. The bed frame also includes side rails 36 connected between respective posts. A connector of the invention is utilized at each of the four corners of the frame, interconnecting the respective ends of the rails and the posts.

As will be described in detail hereinbelow, in the case of each connector, the bracket 22 is mounted on the post, and the hanger 24 is mounted on or in the end of the rail. For convenience in describing the structure of the pieces of the bracket, and their functioning in connecting, the pieces are described as being oriented vertically, as in FIGS. 1 and 4, and thus, the bracket 22 has an upper end 22$u$ and a lower end 22$l$, and similarly the hanger 24 has an upper end 24$u$ and a lower end 24$l$.

FIGS. 10–15 are simple exterior views of the two pieces of the connector, at different steps in shaping, to facilitate consideration of the opposite and symmetrical shaping of the two pieces, from original identical blanks.

FIG. 3 shows, in larger scale, a fragment of the bed frame indicated by the arrow 3 in FIG. 2, being a face view of the post 34 and the side rail 36. In this view the parts of the frame, namely the post and the rail, are shown in connected, or assembled, condition. Attention is directed to FIG. 4 which shows the post and rail of FIG. 3 in still larger scale, and separated and spaced apart. In the assembled bed frame, the rails engage the post directly, and the connectors are hidden, almost entirely, from view.

Referring to the post and the rail in FIGS. 3–9, the post has a vertical exterior side surface 38, and the rail has a vertical exterior end surface 39, these two surfaces interengaging, and providing positive limit means and stability to the assembled frame. The bracket 22 of the connector is mounted on the surface 38 of the post, while the hanger 24 is mounted in a groove 41 formed in the end surface 39 of the rail (FIGS. 5–7). This groove opens out through the end surface, and through the bottom of the rail, but it does not open through the top, an element 42 of the rail defining the top of the notch. When the rail is connected to the post, the bracket 22 extends into the groove and is connected with the hanger 24, as will be described more fully hereinbelow. In the step of connecting the pieces of the connector, the bracket 22 enters into the groove through the open bottom of the groove.

Although the bracket and hanger of the connector are indicated in FIG. 1, before describing their details of finished structure, and functioning, a description of the fabrication of the pieces is given.

The bracket and the hanger at one step in the fabrication thereof are identical stampings or blanks or segments, but are later oppositely and symmetrically shaped in additional forming steps. FIGS. 8 and 9 show the original stampings that form the bracket and hanger respectively, being shown from opposite sides. FIG. 8 shows a stamping 44 that is stamped or cut from a linear strip 46 of flat steel. In forming this stamping, holes 47 are punched for receiving the mounting screws 25 (FIGS. 1, 4) and a notch 48 is cut in the opposite or distal edge 49, substantially in transverse alignment with the center one of the holes 47. FIG. 9 shows an identical stamping 44 turned over and showing the opposite side. The stampings are individually identified 44a and 44b which in subsequent steps become the bracket 22 and hanger 24 respectively.

FIGS. 8 and 9 show dotted lines 51, 52 on which the stampings are bent, to form the elements of the finished connector pieces. Each stamping has a backing element or plate 53 having an outer edge 54, and a side wing or blade 55 extending from the line 51 of the backing element. The wing 55, as oriented vertically (FIGS. 8, 9) is wide at the top, and narrow at the bottom, and is inclined at top and bottom, at 55u and 55l, for strength purposes. It will be noted that in each stamping 44, the line 51 is parallel with the side edge 54 and the line 52 parallel with the diagonal side edge 49. An outer hook element 56 is formed between the line 52 and the outer edge 49.

In each case, after the stamping 44 is thus cut, the stamping is bent on the line 51 to form the wing 55, substantially perpendicular to the backing element 53 as shown in FIGS. 1 and 6. Also the extended edge portion of the blade is bent on the line 52, to a substantially 30° angle 57 to the side element, but the invention is not limited to this precise angle.

The hook element 46 thus forms a hook 58 (FIGS. 12, 13) which is uniform in width throughout the vertical length of the piece, but is inclined relative to the backing element as indicated by the lines 59 (FIGS. 1, 4) which are disposed vertical, as is the backing element. The hook 58 forms a camming element in the interconnecting function. The hook extends into the projection of the backing element and the notch 48 provides access to the screw in the center hole 47.

Although the connector pieces are similar, as they are applied to the frame members, they are reversed in the sense that in the case of the bracket 22 the wide end edge is at the top and in the case of the hanger 24 it is at the bottom. Thus the camming elements per se, formed by the hook 58, are inclined in the same direction. For convenience the connector pieces are considered as having a longitudinal direction extending vertically as viewed in FIGS. 1 and 4.

In the actual steps of interconnecting the frame members, after the connecting pieces are applied thereto, as in the case of a bed frame, the post is held upright, and the rail moved toward it, longitudinally of the rail, above the bracket on the post, and then the rail is moved downwardly, with the upper end of the bracket on the post moving, relatively speaking, upwardly into the groove, and then into camming and interengaging movement relative to the hanger on the rail. The exterior surfaces 38, 39 interengage throughout the area of the smaller surface, which is relatively large, and great stability is provided, as between the rail and the post.

In the case of a bed frame, the connector is virtually hidden from appearance. Although the groove 41 in the rail is open at the bottom, the rail is positioned low, and in ordinary observation of the bed, such opening would not be in sight.

FIG. 7 shows to best advantage the mutual arrangement of the connector pieces. As between the two connector pieces, the hooks 58 are interengaged, and as the hanger is moved down, the camming action pulls the frame member or rail horizontally up against the post, and the two exterior flat surfaces 38, 39 interengage. This interengagement of the surfaces 38, 39 forms a positive limit to movement of the frame members, in horizontal direction, and there are no positive means for positively limiting the vertical movement, there being a space 63 (FIG. 4) between the top of the groove in the rail and the bracket on the post. Referring to FIG. 7, it will be seen that the outer limiting edges of the hooks are spaced from the other fixed elements, as indicated at 66, enabling the frame pieces to move horizontally into engagement with each other in solid engagement.

FIG. 16 shows the use of the connector of the invention for mounting a bracket on a wall. A wall 60 is considered the equivalent of a post 31 and a shelf bracket 71 the equivalent of a rail 36, the connector being shown at 20. A shelf 73 is supported by the shelf bracket.

I claim:

1. A connector for detachably interconnecting frame members having flat surfaces adapted to be disposed vertically and which interengage when the frame members are interconnected, the connector including two pieces adapted to be mounted on the frame members respectively, and when so mounted are in positions set out hereinbelow.

each of said two pieces comprising a bracket and a hanger, separate from the frame members and adapted to be mounted thereon, the pieces having longitudinal directions adapted to be disposed vertically in the direction of said flat surfaces, the pieces having camming elements extending generally in said longitudinal direction but inclined relative thereto and toward each other and being mutually parallel, and also inclined in a plane perpendicular to said flat surfaces, the pieces being adapted to be interengageable in response to movement of one frame member downwardly relative to the other frame member, and adapted to be operable for moving said frame members relatively toward each other in direction perpendicular to said flat surfaces, and thereby moving the flat surfaces into interengagement, and said interengagement thereby adapted to limit movement of the frame members toward each other and also adapted to limit downward movement of said one frame member, each connector piece being a single piece including a backing element and the respective camming element extending generally transverse to the backing element, the backing element is a flat piece, the camming element includes a flat blade extending from one edge of the backing element perpendicularly from the backing element, and the flat blade has a hook at the extended edge thereof.

2. A connector according to claim 1 wherein, the flat blades in the two pieces relatively oppositely converge/diverge in direction longitudinally of the pieces thereby forming mutual camming elements.

3. A connector according to claim 1 wherein, in each connector piece the camming element is shorter than the backing element, thereby leaving end extensions of the backing element beyond the camming element for accommodating means for mounting the connector piece, including holes in the end extensions for receiving mounting screws.

4. A connector according to claim 3 wherein, the backing element also includes a central hole, and the camming element also includes a notch aligned transversely with the central hole in direction perpendicular to the backing element.

5. A connector according to claim 1 wherein, the pieces are constituted by identical stampings having corresponding identical elements shaped in mutually opposite directions.

6. A connector according to claim 5 wherein, the identical stampings are constituted by identical segments cut from a uniform, continuous strip.

7. A connector assembly for interconnecting a pair of frame members having outer flat surfaces in interengaging relation, and in which one of the frame members has a groove in its said outer flat surface of predetermined depth and with a flat bottom surface parallel with its said outer flat surface, said connector assembly including a pair of connector pieces constituted by a bracket and a hanger, each connector piece including, (a) an elongated flat base, (b) a web extending along one side edge of the base and perpendicular thereto, and having a distal edge relative to the base, that is disposed at an acute angle to the base, and (c) a hook along the distal edge, the connector pieces being adapted to be secured respectively to the outer flat surface of one of the frame members and the flat bottom surface of the groove, the hooks of the connector members being oppositely turned when so mounted, and having open ends to enable the hooks to be hookingly engaged by relatively mutual longitudinal movement.

8. A connector assembly according to claim 7, in combination with said frame members.

* * * * *